United States Patent [19]

Yoshimura et al.

[11] Patent Number: 5,097,415

[45] Date of Patent: Mar. 17, 1992

[54] COORDINATES INPUT APPARATUS

[75] Inventors: Yuichiro Yoshimura, Yokohama; Atsushi Tanaka, Kawasaki; Kiyoshi Kaneko, Yokohama, all of Japan

[73] Assignee: Canon Kabushiki Kaisha, Tokyo, Japan

[21] Appl. No.: 609,655

[22] Filed: Nov. 29, 1990

Related U.S. Application Data

[63] Continuation of Ser. No. 515,322, Apr. 30, 1990, which is a continuation of Ser. No. 171,434, Mar. 21, 1988, abandoned.

[51] Int. Cl.$^5$ .............................................. G08C 21/00
[52] U.S. Cl. .................................. 364/237.1; 340/706; 178/18
[58] Field of Search ............... 364/237.1 MS, 709.11, 364/705.03, 561, 560, 559, 460; 340/711, 710, 709, 706; 178/18; 367/129, 127, 122, 119, 105; 33/1 P; 73/625; 376/907

[56] References Cited

U.S. PATENT DOCUMENTS

| | | | |
|---|---|---|---|
| 3,134,099 | 5/1964 | Woo | 178/18 X |
| 3,806,642 | 4/1974 | Veith et al. | 178/18 |
| 3,808,364 | 4/1974 | Veith | 178/18 X |
| 4,317,005 | 2/1982 | de Bruyne | 178/19 |
| 4,564,928 | 1/1986 | Glenn et al. | 367/117 |
| 4,665,282 | 5/1987 | Sato et al. | 178/18 |
| 4,853,496 | 8/1989 | Taniishi | 178/18 |
| 4,886,943 | 12/1989 | Suzuki et al. | 178/18 |
| 4,897,510 | 1/1990 | Tanaka et al. | 178/18 |
| 4,910,363 | 3/1990 | Kobayashi et al. | 178/18 |
| 4,980,518 | 12/1990 | Kobayashi et al. | 178/18 |

Primary Examiner—Parshotam S. Lall
Assistant Examiner—S. A. Melnick
Attorney, Agent, or Firm—Fitzpatrick, Cella, Harper & Scinto

[57] ABSTRACT

A coordinates input apparatus for detecting coordinates of an instructed position from a vibration progagation time on a vibration propagation plate is provided. This apparatus comprises; a vibration pen to generate a vibration; a vibration propagation plate with which the vibration pen is come into contact and which transmits the vibration; a sensor which is arranged in contact relation with the vibration propagation plate and detects the vibration; a vibration-proof material attached to the periphery of the vibration propagation plate so as to have a width of ½ of a wavelength of the elastic wave of the vibration; and an operation controller to calculate the contact position of the vibration pen on the vibration propagation plate from the detection time when the vibration was detected by the sensor. The sensor detects the surface wave of the vibration-proof material. With this apparatus, the coordinates of the instructed point can be accurately detected using the vibration with being hardly influenced by the reflected waves from the periphery of the plate.

5 Claims, 13 Drawing Sheets

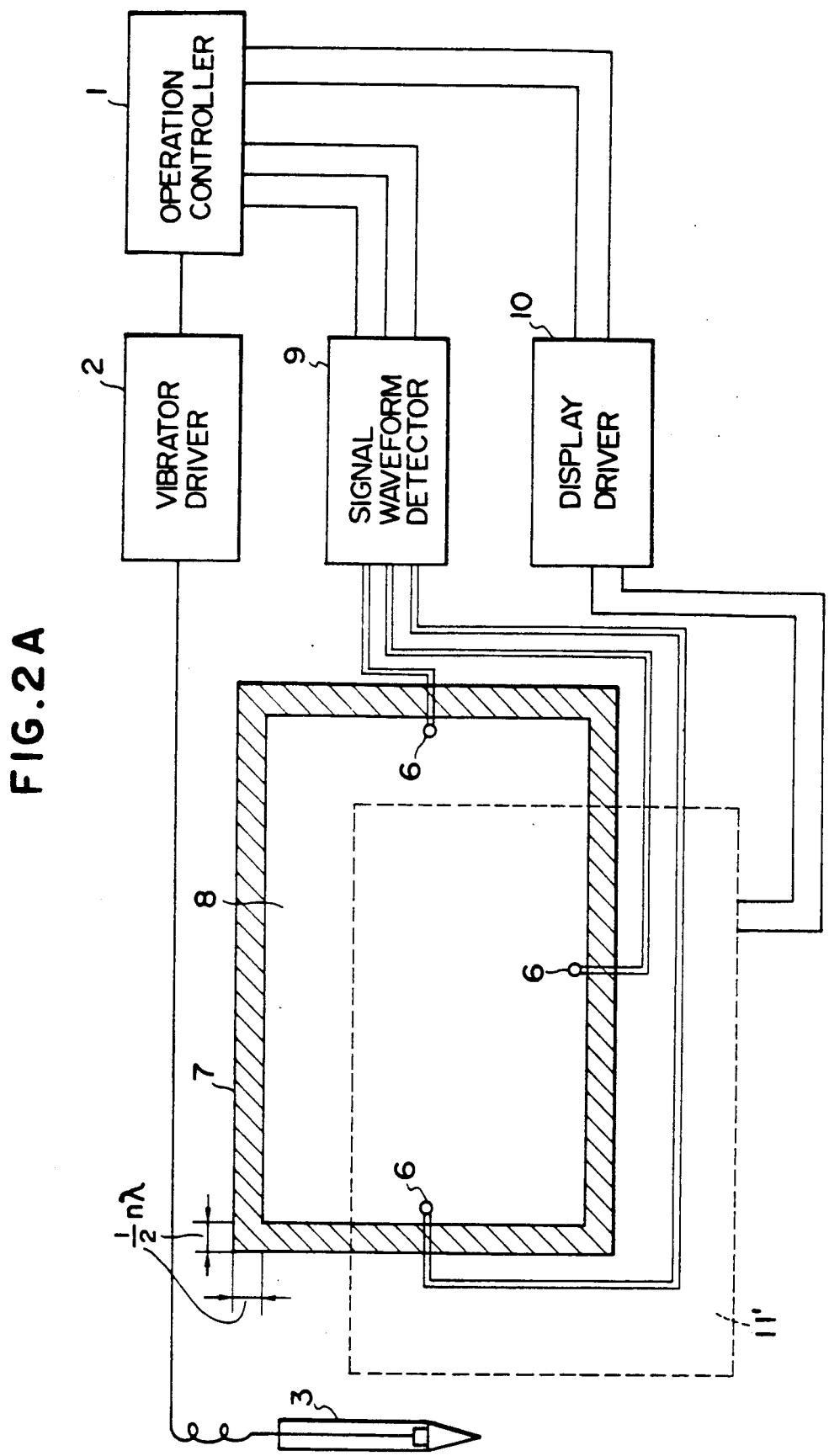

COORDINATES INPUT APPARATUS

This application is a continuation of application Ser. No. 515,322, filed Apr. 30, 1990, which is a continuation of application Ser. No. 171,434, filed on Mar. 21, 1988, both now abandoned.

BACKGROUND OF THE INVENTION

1. Field of the Invention

The present invention relates to a coordinates input apparatus and, more particularly, to a coordinates input apparatus for detecting coordinates of an instructed point from a vibration propagation time on a vibration propagation plate and having a structure in which a vibration-proof material is attached to an edge portion of the vibration propagation plate.

2. Related Background Art

Hitherto, as an apparatus for inputting, a hand-written character, figure, or the like to a processor such as a computer, a coordinates input apparatus using various kinds of input pens, a tablet, and the like is known. According to this kind of apparatus, image information consisting of the input character, figure, and the like is output to a display device such as a CRT display and a recording device such as a printer.

As a method of detecting the coordinates on a tablet in such a kind of apparatus, the following various kinds of methods are known.

1) A method whereby a change in resistance value of a sheet material which is arranged so as to face a resistance film is detected.

2) A method whereby electromagnetic or electrostatic induction of a conductive sheet or the like which is arranged so as to face a coil (an inductor) is detected.

3) A method whereby ultrasonic vibration which is propagated from an input pen to a tablet is detected.

According to the above methods of 1) and 2), since a resistive film and a conductive film are used, it is difficult to form a transparent tablet. On the other hand, according to the method of 3), since the tablet can be made of a transparent material such as acrylic plate or glass plate, it is possible to construct an information input and output apparatus in which the input tablet is overlaid on a liquid crystal display device or the like and this apparatus can be used to give the operator the feeling as if he is writing an image onto paper.

On the other hand, according to the foregoing ultrasound method, various kinds of peculiar problems exist because the coordinates are detected through vibration.

First, according to a method whereby a surface wave is generated on the tablet and this wave is used to detect the coordinates, a reflected wave is generated by a scratch on the vibration propagation plate of the tablet or an obstacle put thereon, so that the coordinates detecting accuracy deteriorates. On the other hand, to avoid the problem of a scratch on the vibration propagation plate, a method whereby the vibration is propagated in air instead of a solid is also considered. However, this method also has a problem in accuracy since the vibration propagation characteristic is changed by an obstacle existing on the propagation path.

Further, a method whereby a plate wave, i.e. an elastic wave propagated in the plate, is used is effective with regard to interference from a scratch or obstacle on the propagation plate. However, since a velocity distribution occurs, there is a problem in that an error is caused in dependence on a vibration wavelength in the detection based on a certain threshold value.

On the other hand, in a method whereby the elastic wave vibration is propagated on the vibration propagation plate, a reflected wave is caused at the edge of the vibration propagation plate. Thus, there is a problem in that if the reflected wave is synthesized with the direct wave, a distortion occurs in the detected wave form and the detecting accuracy deteriorates.

To prevent this problem, there is considered a structure such that the peripheral portion of the vibration propagation plate is supported by a vibration-proof material made of polymeric materials or the like. Such a conventional method has a problem such that when the vibration is input at a position near the vibration-proof material, the detection level remarkably decreases, so that the coordinates detecting accuracy also deteriorates.

On the other hand, such a coordinates input apparatus has a structure such that the edge portion of the vibration propagation plate is supported by the vibration-proof material in order to prevent errors from being caused in the detection by a vibration sensor due to the reflected wave of the input vibration at the edge of the vibration propagation plate. As used in the present specification, the term "vibration-proof material" means a generally non-resonating, dampening material effective to suppress or substantially attenuate vibration thereat.

The conventional vibration-proof materials are mainly developed to prevent such noises and are mainly classified as materials used as a countermeasure for sound in the air and materials used as a countermeasure for sound in a solid. Therefore, the latter material is used in the case where the conventional vibration-proof material is used in the foregoing application. As the conventional vibration-proof materials used as the countermeasures for sound in the solid, a vibration-proof sheet, a paint, or the like for a thin plate as shown in FIG. 1A is known.

In FIG. 1A, reference numeral 8' denotes a vibration plate whose vibration is to be suppressed, and 7 indicates a vibration-proof sheet. The vibration plate 8' is made of a thin steel plate, a metal plate such as an aluminum plate, a resin sheet, a glass sheet, or the like.

In this structure, by adhering the vibration-proof sheet 7 onto the vibration plate 8' which vibrates, the vibration of the plate 8' can be reduced by using the vibration attenuation of the sheet 7 and the noise can be reduced.

As examples of materials for the vibration-proof sheet 7 which are commercially available, there can be mentioned polyvinyl chloride resin, atactic polypropylene, polyethylene-vinyl acetate, styrene butadiene rubber, silicone rubber, cement paste, or the like. Further, it is also possible to use the material which is obtained by adding or mixing thereto plasticizer, stabilizer, softener, metal powder such as lead or iron, quartz sand, asphalt, or the like. The sheet 7 is formed in a sponge-like porous shape.

However, it is to be noted that the conventional vibration-proof sheet as mentioned above is mainly adhered to the whole vibrating plate, thereby suppressing the vibration of the whole plate.

Therefore, even if the vibration-proof material is attached to the periphery of a vibration propagation plate 8 as shown in FIG. 1B to prevent reflected waves at the edges of the vibration propagation plate as mentioned above, the reflected waves cannot be sufficiently reduced.

FIG. 1B is a diagram showing the vibration propagation in the case where the vibration-proof sheet is attached to the peripheral portion of the vibration propagation plate. FIG. 1C is a cross sectional view showing a state of reflected wave in a part of FIG. 1B.

In the diagram, reference numeral 8 denotes the vibration propagation plate; 7 is the vibration-proof sheet; 3 is a vibration pen serving as a source for applying the vibration; A is a wave showing the vibration which is propagated from a vibration adding point as a contact point between the vibration pen 3 and the vibration propagation plate 8; B is a reflected wave at the edge surface of the plate 8; and C is a reflected wave at the boundary surface where the vibration-proof sheet 7 is adhered. The waves A, B, and C are diagrammatically illustrated in FIG. 1C, respectively.

The conventional vibration-proof sheet 7 has a large vibration-proof effect to the vibration (also including the natural vibration, i.e., the resonant vibration) which is generated in the whole plate as mentioned above. However, as shown in FIG. 1B, a sufficient vibration-proof effect is not obtained for the vibration in the form of progressive waves which are propagated from the portion to which the vibration was applied in the area where the vibration-proof sheet 7 is not attached. Therefore, as shown in FIG. 1C, although the vibration is slightly attenuated in the portion D where the sheet 7 is attached, the reflected wave B at the edge of the vibration propagation plate cannot be sufficiently suppressed.

Further, by attaching the conventional vibration-proof sheet 7, the reflected wave C is newly generated from the boundary surface where the vibration-proof sheet is attached. Therefore, when the conventional vibration-proof sheet is merely attached to the peripheral portion of the vibration propagation plate of the coordinates input apparatus using the elastic waves, there are drawbacks in that the foregoing two kinds of reflected waves are generated and become noises when the direct wave from the vibration applying source is detected, so that the detecting accuracy deteriorates.

SUMMARY OF THE INVENTION

It is an object of the present invention to provide a coordinates input apparatus using vibration in which this apparatus is influenced hardly at all by influenced by the reflected waves from the periphery of a vibration propagation plate.

Another object of the invention is to provide a coordinates input apparatus using vibration in which the reflected waves can be reduced.

Still another object of the invention is to provide a coordinates input apparatus in which a sensor to detect the vibration is attached to a position where it is influenced hardly at all by the reflected waves.

BRIEF DESCRIPTION OF THE DRAWINGS

FIGS. 2A and 2B are explanatory diagrams showing an arrangement of a coordinates input section in an information input and output apparatus in which the invention is applied, respectively;

DETAILED DESCRIPTION OF THE PREFERRED EMBODIMENTS

The present invention will be described in detail hereinbelow with respect to an embodiment shown in the diagrams.

Figure 2B:
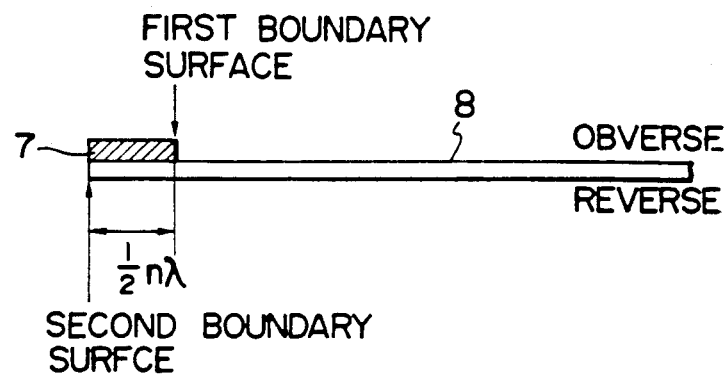

FIG. 2A shows a structure of a coordinates input apparatus in which the invention is applied. The coordinates input apparatus in FIGS. 2A and 2B constitutes an information input and output apparatus for characters, figures, images, etc. together with a display device 11' having a display system such as a dot matrix system.

In the diagram, the vibration propagation plate 8 is made of acrylic resin, glass plate, or the like and propagates the vibration which is propagated from the vibration pen 3 to three vibration sensors 6 attached to the side portions of the vibration propagation plate In the coordinates detection using the vibration pen in the embodiment, the propagation times of the ultrasonic vibrations propagated from the vibration pen 3 to the vibration sensors 6 through the vibration propagation plate 8 are measured, thereby detecting the coordinates of the virbation pen 3 on the plate 8.

The vibration-proof material 7 made of a synthetic resin or the like is attached to the vibration propagation plate 8 as shown in FIG. 2B in order to prevent the vibration propagated from the vibration pen 3 from being reflected by the peripheral portion of the plate 8 and returned toward central portion. The vibration-proof material 7 is adhered onto the obverse of the plate 8 with the distance difference which is equal to integer times of ½ of the wavelength of the vibration propagation wave.

With this structure, as will be explained in detail hereinlater, the reflected waves generated from the boundary surfaces of the vibration-proof materials 7 adhered to the obverse and reverse are deviated by ½ wavelength, i.e. the waves are 180° out of phase, so that the reflected waves interfere so as to cancel or attenuate each other. The three vibration sensors 6 are attached to the peripheral portion of the vibration propagation plate 8 and detect the elastic waves which are propagated from the pen 3.

The plate 8 is set on the display device 11' such as a CRT (or liquid crystal display) which can display image data by dots, thereby dot displaying an image at the position which is traced by the vibration pen 3. Namely, a dot is displayed at the position on the display device 11' corresponding to the detected coordinates of the pen 3. The image constituted by elements such as dots, line, or the like which were input by the pen 3 appears following the locus of the vibration pen as if it was written onto a paper.

On the other hand, according to such a constitution, it is also possible to use an input system in which a menu is displayed on the display device 11' a desired item in the menu is selected by the vibration pen, a prompt is displayed, and the vibration pen 3 is allowed to touch a predetermined position, or the like.

The vibration pen 3 used to propagate the ultrasonic vibration to the vibration propagation plate 8 has a vibrator 4 having therein a piezoelectric transducer or the like. The ultrasonic vibration generated by the vibrator 4 is propagated to the vibration propagation plate 8 through a horn portion 5 having a pointed tip.

Figure 3:
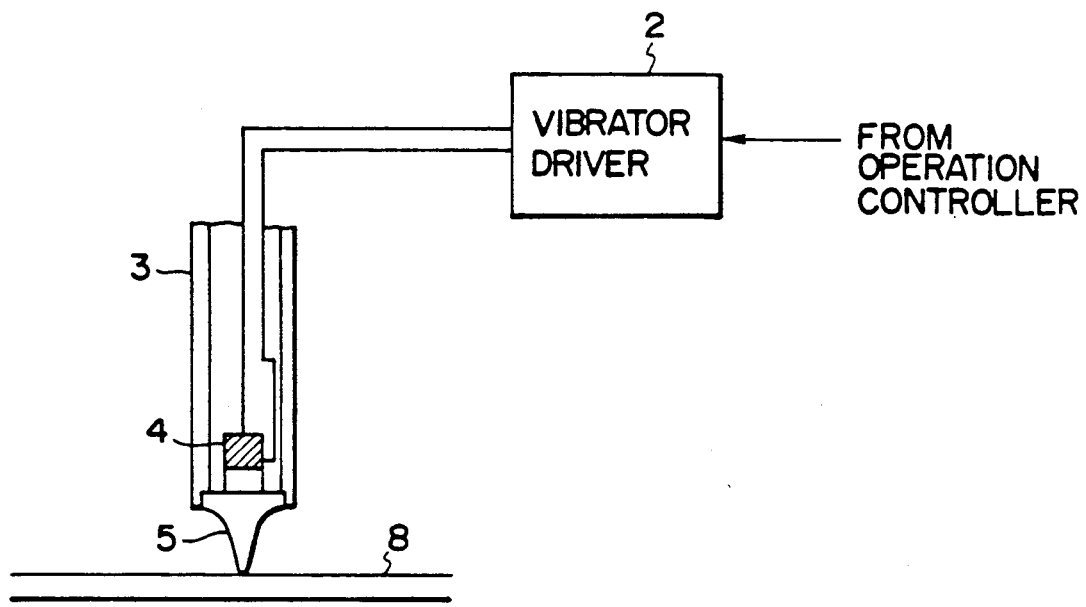
FIG. 3 is an explanatory diagram showing a structure of a vibration pen in FIGS. 2A and 2B.

FIG. 3 shows a structure of the vibration pen 3. The vibrator 4 provided in the pen 3 is driven by a vibrator driver 2. A drive signal of the vibrator 4 is supplied as a low-level pulse signal from an operation controller 1 in FIG. 2A. This signal is amplified with a predetermined gain by the vibrator driver 2 which can drive at a low impedance. Thereafter, the signal is applied to the vibrator 4.

The electrical drive signal is converted into mechanical ultrasonic vibration by the vibrator 4 and propagated to the plate 8 through the horn portion 5.

A vibrating frequency of the vibrator 4 is selected to a value such as to enable the vibration propagation plate 8 made of, acryl, glass or the like to generate a plate wave. On the other hand, a vibrating mode is selected in a manner such that when the vibrator is driven, the vibrator 4 primarily vibrates in the vertical direction in FIG. 3 to the plate 8. Further, by setting the vibrating frequency of the vibrator 4 to the resonant frequency of the vibrator 4, the vibration conversion can be efficiently performed.

The elastic wave which is transferred to the plate 8 as mentioned above is the plate wave and has an advantage such that it is influenced hardly at all by a scratch, obstacle, or the like on the surface of the plate 8 as compared with a surface wave or the like.

Returning to FIG. 2A, each vibration sensor 6 attached to the corner portion of the plate 8 is also constituted by a mechanical-electrical converting device such as a piezoelectric transducer. Output signals of the three vibration sensors 6 are input to a waveform detector 9 and converted into detection signals which can be processed by the operation controller 1 at the post processing stage. The operation controller 1 measures the vibration propagation times, thereby detecting the coordinates position of the pen 3 on the plate 8.

The detected coordinates information of the pen 3 is processed by the operation controller 1 in accordance with an output method for the display device 11'. That is, the operation controller controls the output operation of the display device 11' through a display driver 10 on the basis of the input coordinates information.

Figure 4:
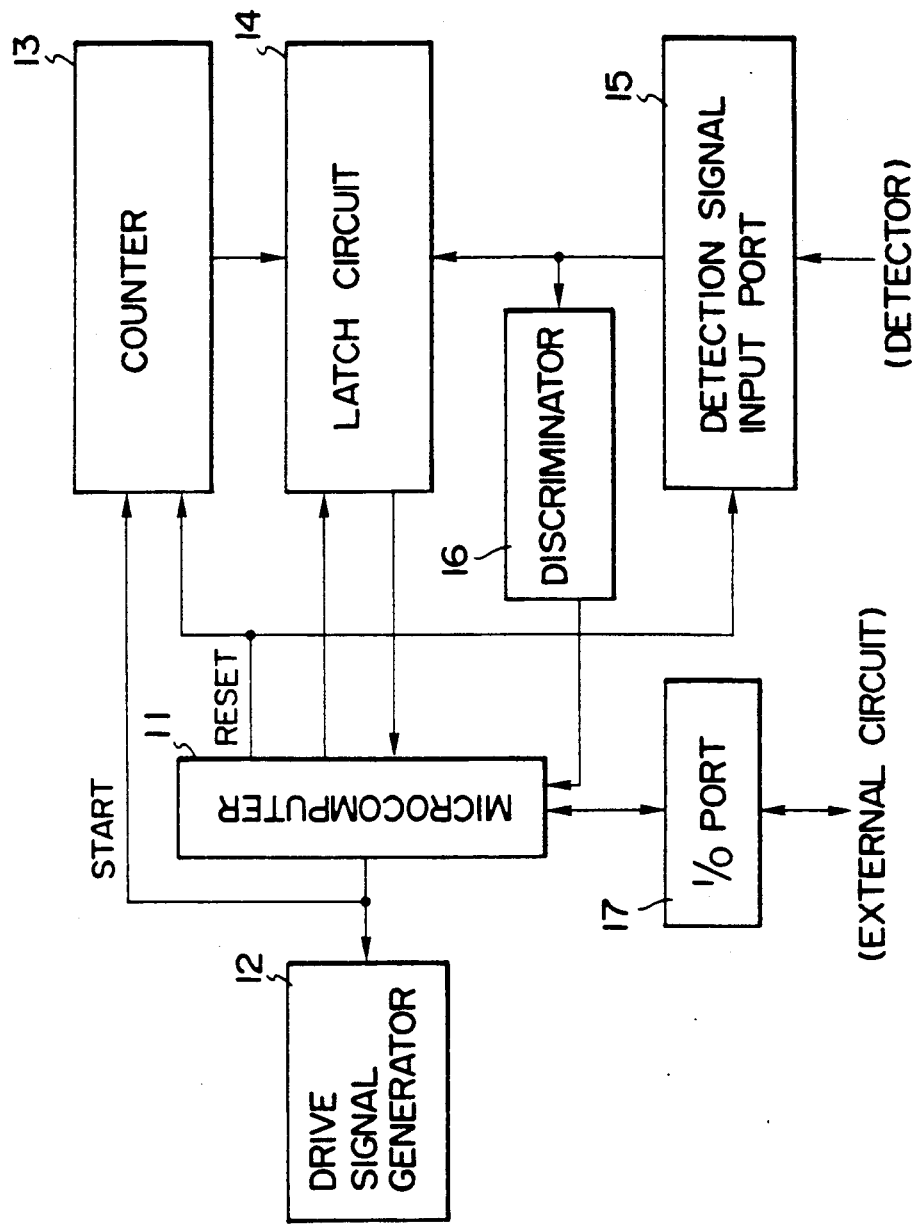
FIG. 4 is a block diagram showing a structure of an operation controller in FIGS. 2A and 2B.

FIG. 4 shows a structure of the operation controller 1 in FIG. 2A. In this case, this diagram mainly shows the structures of the drive system of the vibration pen 3 and of the vibration detection system by the vibration sensors 6.

A microcomputer 11 has therein an internal counter, an ROM, and an RAM. A drive signal generator 12 outputs a drive pulse of a predetermined frequency to the vibrator driver 2 in FIG. 2A and is made operative by the microcomputer 11 synchronously with a circuit to calculate the coordinates.

A count value of a counter 13 is latched by a latch circuit 14 controlled by the microcomputer 11.

On the other hand, the waveform detector 9 outputs timing information of the detection signals to measure the vibration propagation times for detection of the coordinates and signal level information to detect a writing pressure from the outputs of the vibration sensors 6 as will be explained hereinlater. The timing and level information are input to an input port 15 and a discriminator 16, respectively.

A timing signal which is input from the waveform detector 9 is input to the input port 15 and compared with the count value in the latch circuit 14 by a discriminator 16. The result of the comparison is sent to the microcomputer 11. Namely, the vibration propagation time is expressed as a latch value of the output data of the counter 13. The coordinates are calculated from the vibration propagation time value.

The output control process of the display device 11' is performed through the I/O port 17.

Figure 5:
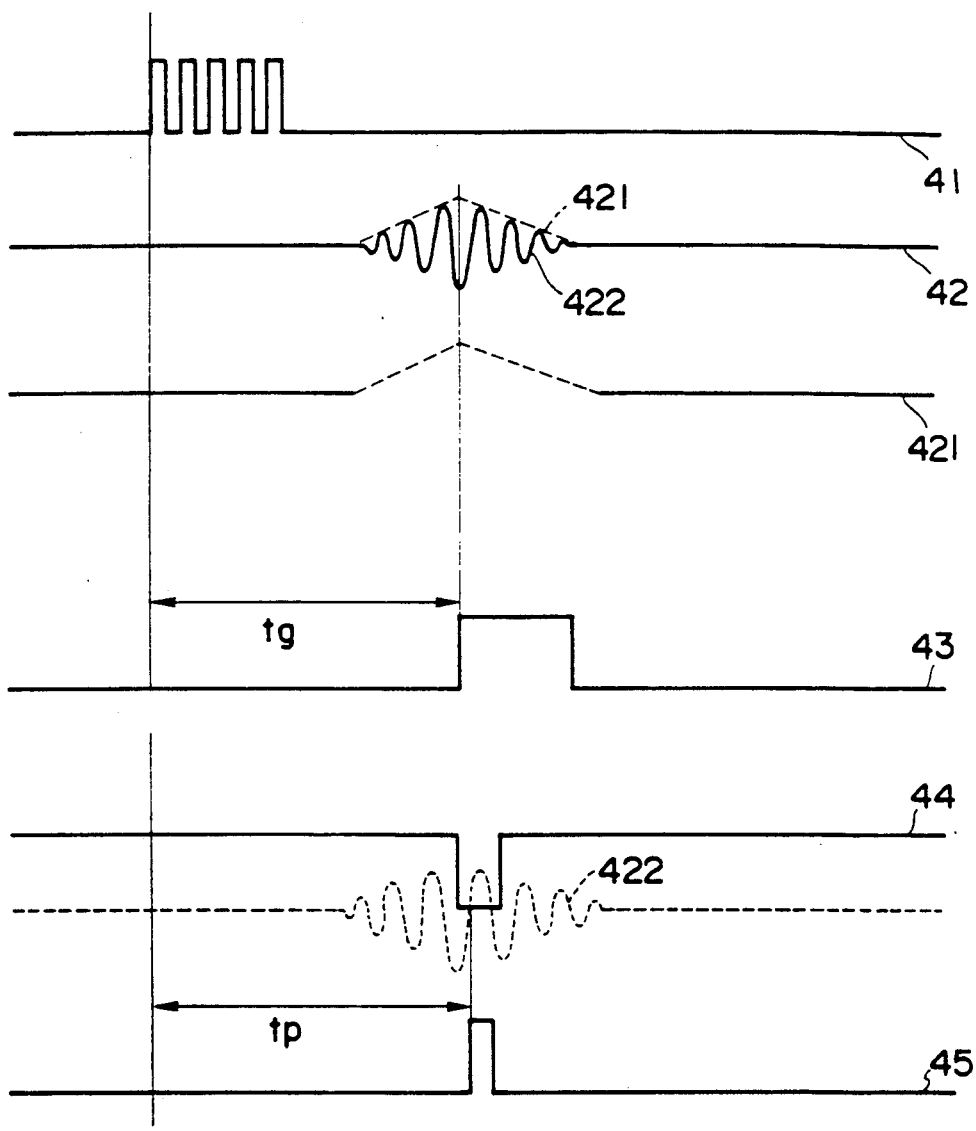
FIG. 5 is a waveform diagram showing detection waveforms for explaining the measurement of the distance between the vibration pen and the vibration sensor.

FIG. 5 is a diagram for explaining a detection waveform which is input to the waveform detector 9 in FIG. 2A and the measuring process of the vibration propagation time based on the detection waveform. In FIG. 5, a drive signal pulse 41 is supplied to the vibration pen 3. The ultrasonic vibration propagated to the vibration propagation plate 8 from the vibration pen 3 driven by such a waveform is propagated by the plate 8 and detected by the vibration sensors 6.

After the vibration has progressed in the plate 8 for a period of time $t_g$ corresponding to the distance until each vibration sensor 6, the vibration reaches the sensor 6. Reference numeral 42 in FIG. 5 denotes a signal waveform detected by the vibration sensor 6. The plate wave which is used in the embodiment is the dispersive wave. Therefore, the relation between an envelope 421 and a phase 422 of the detection waveform to the propagation distance in the vibration propagation plate 8 changes in accordance with the propagation distance during the propagation of the vibration.

It is now assumed that progressing velocities of the envelope are $V_g$ for group velocity and $V_p$ for phase velocity. The distance between the vibration pen 3 and the vibration sensor 6 can be detected from the difference between the group velocity and the phase velocity.

First, when attention is paid to only the envelope 421, the velocity thereof is $V_g$. When a point, e.g., a peak on a specific waveform is detected as indicated at reference numeral 43 in FIG. 5, a distance d between the pen 3 and the sensor 6 is expressed as follows when the vibration propagation time assumes $t_g$.

$$d = V_g \cdot t_g \qquad (1)$$

Although this equation relates to one of the vibration sensors 6, the distances between the other two vibration sensors 6 and the vibration pen 3 can be also expressed by the same equation.

Further, a process based on the detection of the phase signal is performed to determine the coordinates values with a higher accuracy. Assuming that a period of time from a specific detection point of the phase signed waveform 422 in FIG. 5, e.g., a vibration applied point, to a zero-cross point after the passing of the peak is $t_p$, the distance d between the vibration sensor and the vibration pen is expressed by $$d = n \cdot \lambda_p + V_p \cdot t_p \qquad (2)$$

$\lambda_p$ denotes a wavelength of the elastic wave and n is an integer.

From the above equations (1) and (2), the integer n is expressed by $$n = [(V_g \cdot t_g - V_p \cdot t_p)/\lambda_p + 1/N] \qquad (3)$$

N is a real number other than 0 and is set to a proper numerical value. For example, when N is set to 2, n can be determined within a range of $\pm \frac{1}{2}$ wavelength. In this manner, the resultant value of n can be decided.

By substituting the value of n in the equation (2), the distance between the vibration pen 3 and the vibration sensor 6 can be accurately measured.

Figure 6:
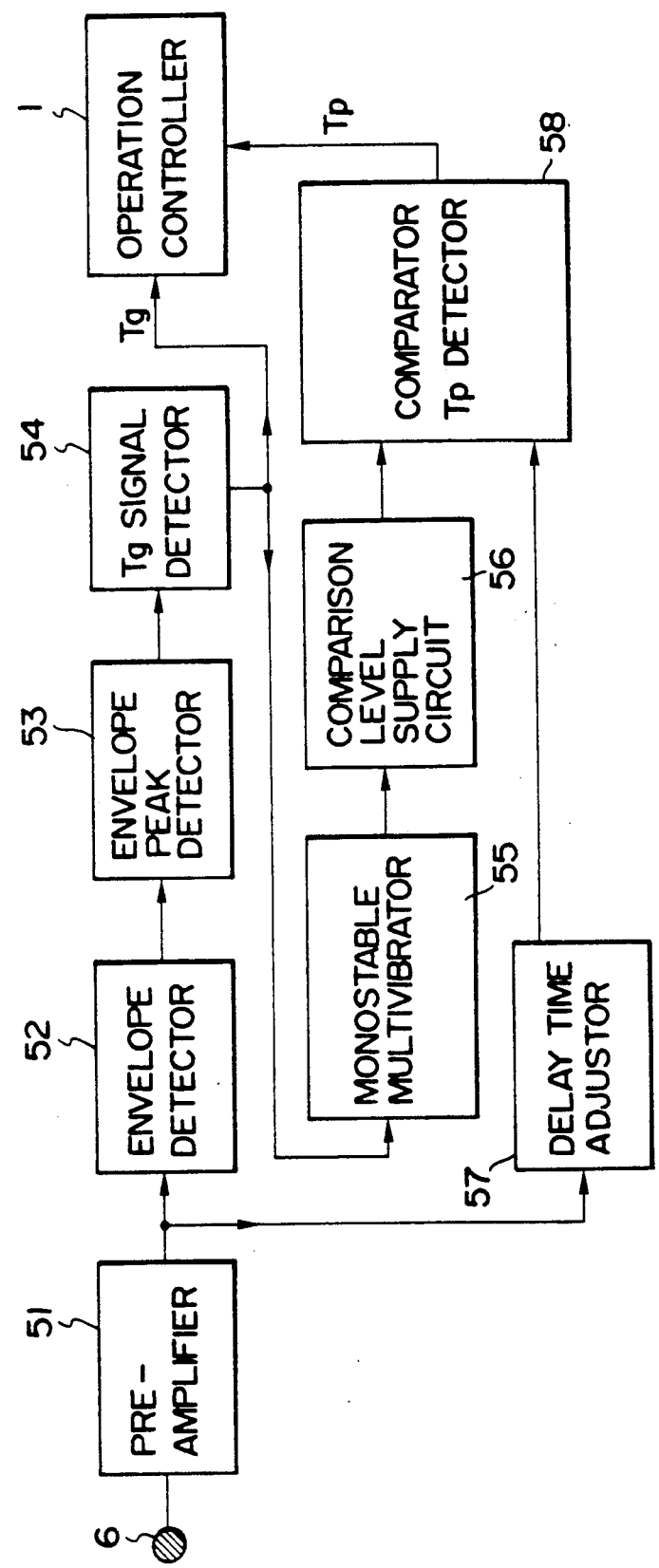
FIG. 6 is a block diagram showing a constitution of a waveform detector in FIGS. 2A and 2B.

The two vibration propagation times $t_g$ and $t_p$ shown in FIG. 5 can be measured by the waveform detector 9 in FIG. 2A. The waveform detector 9 is constituted as shown in FIG. 6. The waveform detector in FIG. 6 also processes the level information of the output waveform of the vibration sensor 6 as will be explained hereinafter in order to detect a writing pressure.

In FIG. 6, an output signal of the sensor 6 is amplified to a predetermined level by a pre-amplifier 51. The amplified signal is input to an envelope detector 52, so that only the envelope of the detection signal is taken out. The timing of the peak of the extracted envelope is detected by an envelope peak detector 53. The peak detection signal is supplied to a signal detector 54 consisting of a monostable multivibrator or the like. Thus, an envelope delay time detection signal $T_g$ of a predetermined waveform is formed by the detector 54 and input to the operation controller 1.

On the other hand, a phase delay time detection signal $T_p$ is formed by a comparator detector 58 from the $T_g$ signal and the original signal delayed by a delay time adjustor 57. The signal $T_p$ is then input to the operation controller 1.

The foregoing circuit relates to one of the vibration sensors 6 and the same circuit is also provided for each of the other two vibration sensors. Assuming that the number of sensors is generally set to h, h detection signals consisting of the envelope delay times $T_{g1}$ to $T_{gh}$ and phase delay times $T_{p1}$ to $T_{ph}$ are input to the operation controller 1.

The operation controller in FIG. 4 receives the signals $T_{g1}$ to $T_{gh}$ and $T_{p1}$ to $T_{ph}$ from the input port 15 and stores the count value of the counter 13 into the latch circuit 14 by using each timing as a trigger signal. Since the counter 13 is made operative synchronously with the drive timing of the vibration pen as mentioned above, the data indicative of the delay time of each of the envelopes and phases is latched into the latch circuit 14.

Figure 7:
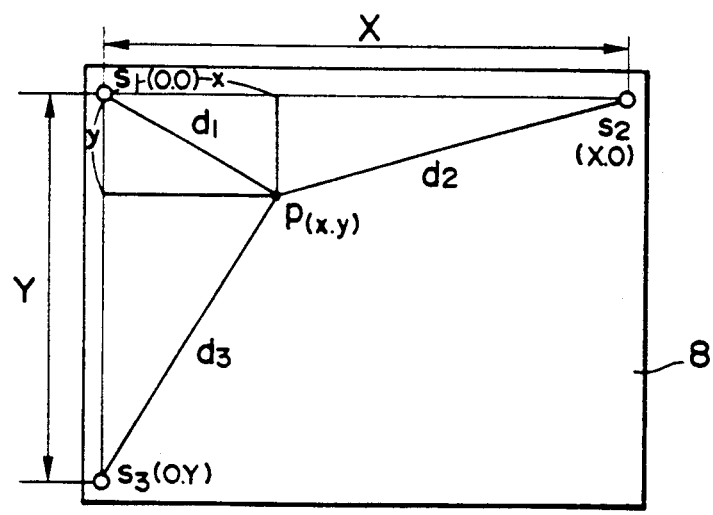
FIG. 7 is an explanatory diagram showing an arrangement of the vibration sensor.

For example, when three vibration sensors 6 are arranged at the corner positions $S_1$ to $S_3$ on the vibration propagation plate 8 as shown in FIG. 7, the straight line distances $d_1$ to $d_3$ from the position P of the vibration pen 3 to the position of the sensors 6 can be obtained by the processes described in conjunction with FIG. 5. Further, the coordinates (x, y) of the position P of the pen 3 can be obtained by the operation controller 1 on the basis of the distances $d_1$ to $d_3$ in accordance with the theorem of three squares (pythagorean theorem) by the following equations.

$$x = X/2 + (d_1 + d_2)(d_1 - d_2)/2X \qquad (4)$$

$$y = Y/2 + (d_1 + d_3)(d_1 - d_3)/2Y \qquad (5)$$

X and Y denote distances along the X and Y axes between the vibration sensors 6 at the positions $S_2$ and $S_3$ and the sensor at the origin (position $S_1$).

Figure 1A:
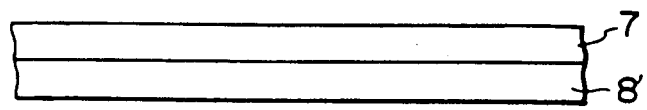
FIG. 1A is an explanatory diagram showing an attaching structure of a conventional vibration-proof material.
Figure 1B:
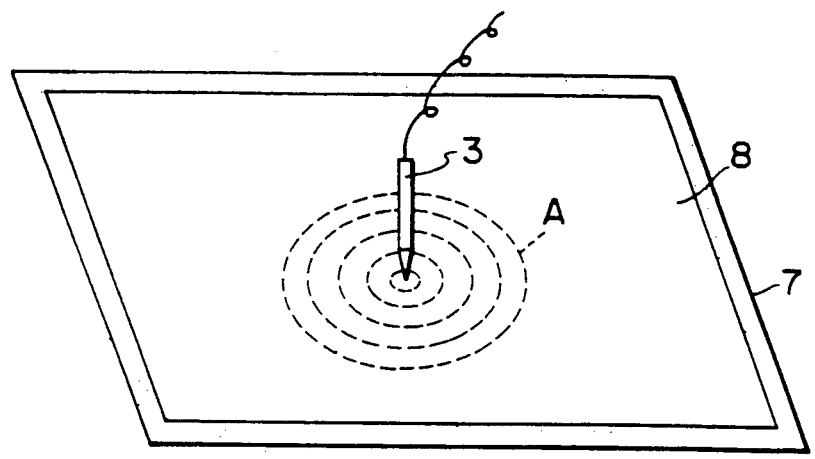
FIGS. 1B and 1C are explanatory diagram showing an attaching structure of a vibration-proof material in a conventional coordinates input apparatus, respectively.
Figure 1C:
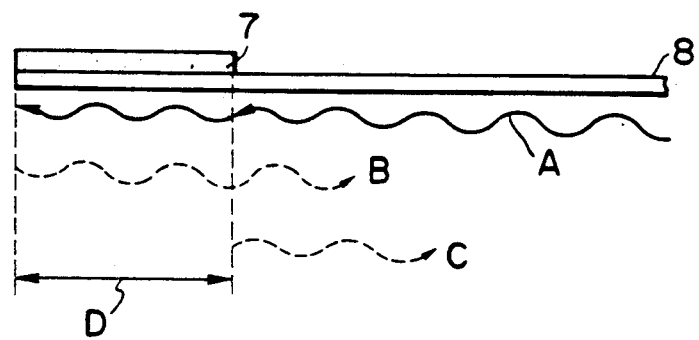

As explained above, the coordinates of the position of the vibration pen 3 can be detected in a realtime manner. Even if the vibration sensors 6 are arranged at the centers of three sides of the vibration propagation plate 8 as shown in FIG. 1A, the coordinates of the position of the vibration pen can be detected by moving the origin and performing arithmetic operations similar to FIG. 6.

(First Embodiment)

Figure 8:
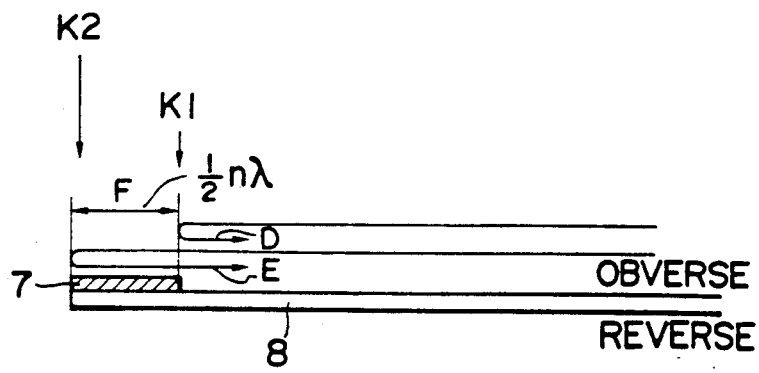
FIGS. 8 to 11 are explanatory diagrams showing different vibration-proof structures, respectively.

The attaching position of the vibration-proof material as an embodiment of the invention shown in FIG. 2B will now be described. As shown in FIG. 8, the vibration-proof material 7 having width $F = n\lambda/2$ from the edge of the vibration propagation plate 8 is attached to the surface of the plate 8.

$\lambda$ denotes a wavelength of the elastic wave which is generated from the vibration pen 3 for use in the apparatus and is propagated in the vibration propagation plate 8.

The elastic wave generated from the vibration pen 3 is first reflected by a first boundary surface $K_1$ of the vibration-proof material 7 attached to the surface as shown at D. Since the vibration of the vibration-proof material 7 is restricted at the first boundary surface $K_1$, the phase of the reflected wave is deviated by 180°.

On the other hand, the elastic wave component which is not reflected by the boundary surface $K_1$ progresses to the edge of the plate 8 as shown at E and is reflected by a second boundary surface $K_2$ at the edge of the plate 8. The phase of the reflected wave is not deviated by this reflection.

Therefore, since there is the phase deviation caused by the distance which is twice as long as n $\frac{1}{2}$, when the reflected wave E is synthesized with the reflected wave D, the reflected waves D and E become elastic waves of opposite phases, so that they interfere and cancel. Thus, the total reflected wave which is created at the boundary surface $K_1$ of the vibration-proof material is significantly decreased.

By setting the width of the vibration-proof material 7 as mentioned above, the reflected wave which is generated hitherto at the inner edge of the vibration-proof material 7 adhered is allowed to act on the reflected wave generated at the outer edge of the vibration propagation plate 8, sq that both of the reflected waves can be simultaneously reduced.

In this embodiment, since it is sufficient to merely adjust the width of the vibration-proof material 7, the number of parts is not increased, so that it is advantageous in reducing cost.

(Second Embodiment)

In the above embodiment, all of the vibration-proof material 7 is adhered in the range of the distance $F = n \lambda/2$ from the edge of the vibration propagation plate 8. However, as shown in the upper and middle stages in FIG. 9, the width of the vibration-proof material 7 can be set to an arbitrary value so long as the first boundary surface $K_1$ is formed at the same position as that shown in FIG. 8. On the other hand, as shown in the lower stage in FIG. 9, the vibration propagation plate 8 can be also supported by the vibration-proof material 7 so as to sandwich both sides of the plate 8 by the material 7.

Figure 9:
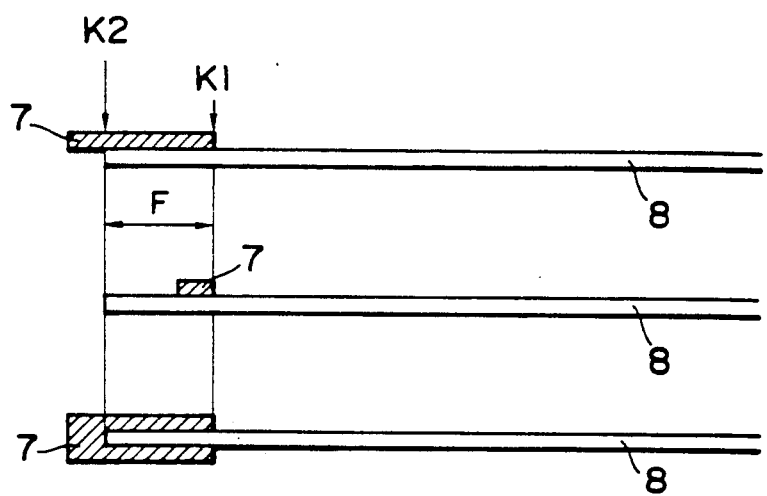

To enhance the reflected wave attenuating effect mentioned above, it is best to equalize the amplitudes of the reflected waves D and E of the opposite phases For this purpose, by adjusting the width of the vibration-proof material 7 as shown in FIG. 9, the amplitudes of the reflected waves D and E can be adjusted.

(Third Embodiment)

Figure 10:
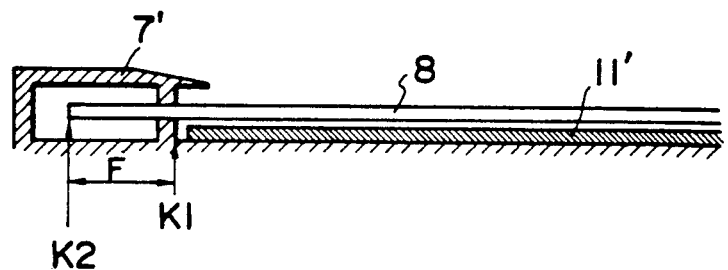

FIG. 10 shows the third embodiment.

In FIG. 10, reference numeral 7' denotes a supporting member of the vibration propagation plate 8 having a vibration suppressing characteristic which is equivalent to the vibration-proof material of the first and second embodiments. The supporting member 7' is made of a material such as polymeric materials, synthetic resin, metal, cement, asphalt, glass, or the like.

The display device 11' and vibration propagation plate 8 are laminated on the supporting member 7'. The plate 8 is supported by an almost ㄱ-shaped supporting portion at the edge of the supporting member 7'. The supporting point of the plate 8 by the supporting portion of the supporting member 7' is located at the position of the distance $F = n \lambda/2$ from the edge of the plate 8 in a manner similar to the above.

With this structure, the first and second boundary surfaces $K_1$ and $K_2$ can be also formed and a similar effect can be obtained.

(Fourth Embodiment)

In the above embodiment, the edge of the plate 8 is used as the boundary surface regarding the reflection of the elastic wave. With regard to the elastic reflection, the edge of the vibration propagation plate 8 can be considered to be theoretically equal to a discontinuous shape portion of the plate 8.

Figure 11:
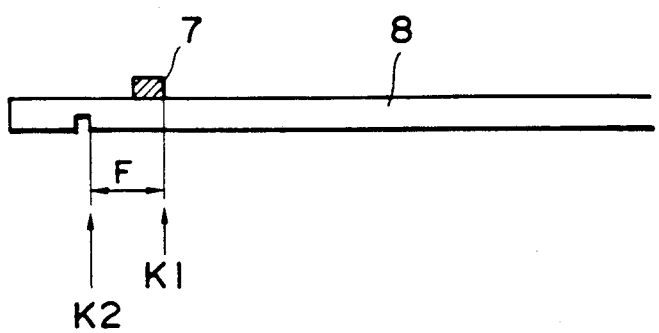

Therefore, the second boundary surface $K_2$ can be constituted by a groove formed on the lower surface (or upper surface) of the vibration propagation plate 8 as shown in FIG. 11 instead of the edge of the plate 8. A distance F between the groove serving as the boundary surface $K_2$ and the boundary surface $K_1$ at the edge of the vibration-proof material 7 is similarly set to $n \lambda/2$.

With this structure, the limitations regarding the size of the vibration propagation plate 8, the attaching position of the vibration-proof material 7, and the like can be reduced.

Figure 12A:
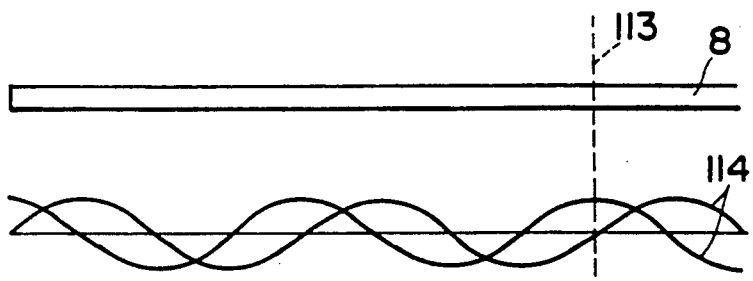
FIGS. 12A and 12B are explanatory diagrams showing the difference between the vibration waveforms in dependence on the presence or absence of a vibration-proof material 7, respectively.
Figure 12B:
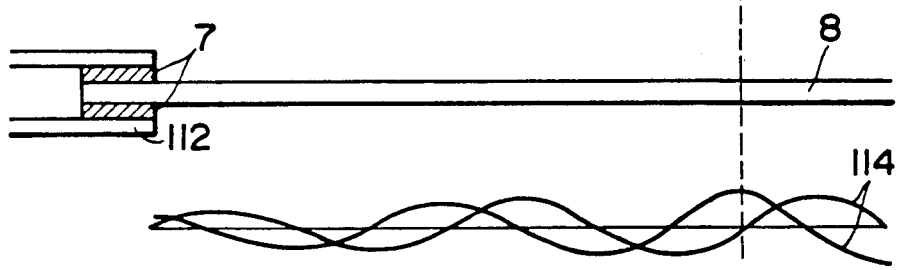

FIGS. 12A and 12B show the differences between the vibration propagating characteristics depending on the presence or absence of the vibration-proof material 7. FIG. 12A shows the case where the vibration-proof material 7 is not attached. FIG. 12B shows the case where the vibration-proof material 7 is attached. The vibration propagation plate 8 is sandwiched by the vibration-proof materials 7 on both sides. The vibration-proof material 7 and vibration propagation plate 8 are supported by a supporting member 112. Two ultrasonic waveforms which are propagated by the vibration propagation plate 8 at different time points are enlargedly shown in the lower portions in FIG. 12A and 12B.

When the vibration-proof material 7 is not attached, the amplitude is not attenuated as shown in FIG. 12A. On the contrary, when the vibration-proof material 7 is attached, as shown in FIG. 12B, the vibration is attenuated in the peripheral portion of the vibration propagation plate 8 (in FIGS. 12A and 12B, the attenuations of the vibration depending on the distance are omitted).

Figure 13A:
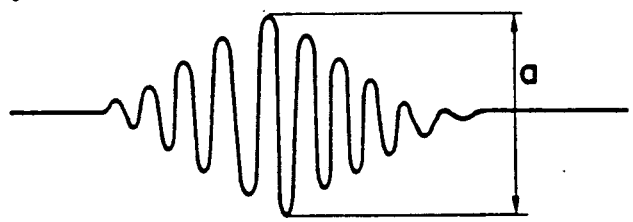
FIGS. 13A and 13B are diagrams showing vibration waveforms which are detected in the constructions in FIGS. 12A and 12B, respectively.
Figure 13B:
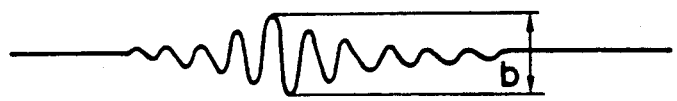

In particular, when the vibration-proof material 7 is attached as shown in FIG. 12B, the vibration is restricted by the vibration-proof material 7 and the amplitude is fairly attenuated in the area within two wavelengths from the vibration-proof material 7, i.e., in the area on the left side of a broken line 113 in FIGS. 12A and 12B. FIGS. 13A and 13B show vibration waveforms which are detected in the structures of FIGS. 12A and 12B, respectively. An amplitude b of the detection waveform of FIG. 13B is remarkably attenuated compared with an amplitude a of FIG. 13A.

Therefore, when the foregoing detecting system is used, the detecting accuracy of the envelope (421 in FIG. 5) extremely deteriorates, so that the coordinates cannot be detected or the detecting accuracy deteriorates. On the other hand, in the area on the right side than the position 113, the amplitude of the elastic wave is hardly attenuated and the coordinates can be accurately detected.

This point will be further described with reference to FIGS. 14 to 16.

Figure 14:
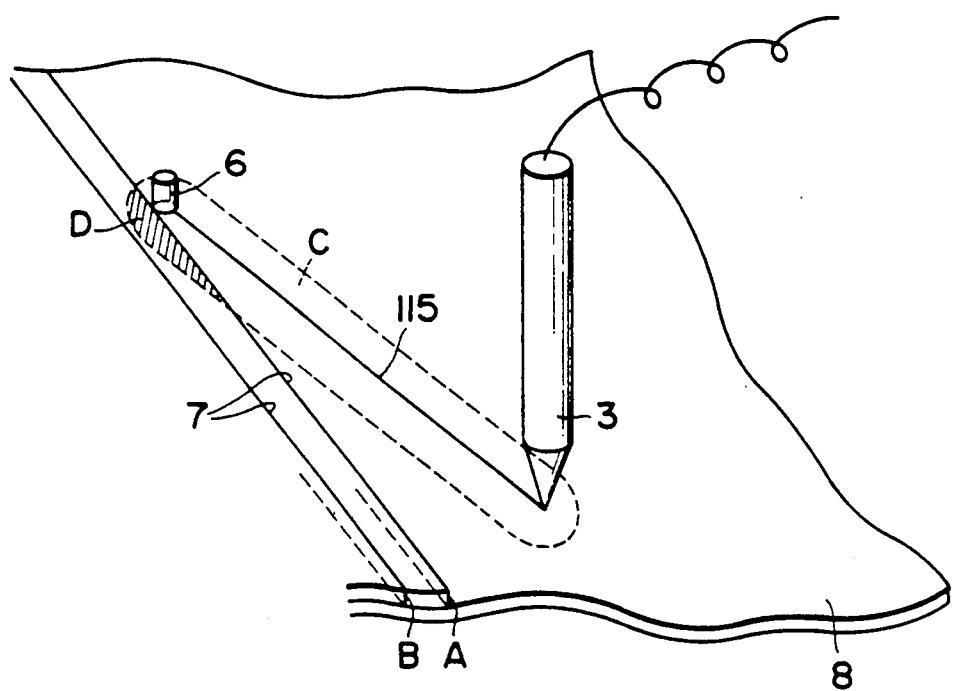
FIG. 14 is a perspective view showing the positional relations among the vibration pen, the vibration sensor, and the vibration-proof material.
Figure 15:
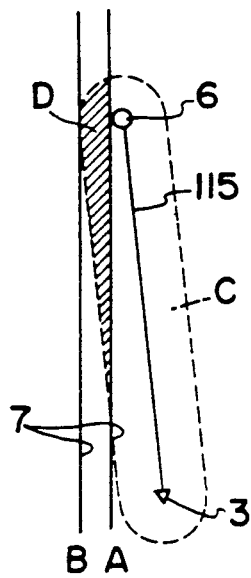
FIG. 15 is a plan view of FIG. 14.

FIGS. 14 and 15 two-dimensionally show the relations between the distance from the vibration-proof material 7 and the range where the amplitude of the elastic wave decreases. FIG. 14 is a perspective view showing the relations among the vibration pen 3, vibration sensor 6, vibration-proof material 7, and vibration propagation plate 8, and the vibration propagation path. FIG. 15 shows a plan view.

When a vibration is input by the vibration pen 3, the elastic wave is propagated to the plate 8 and passes through a path 115 and is transferred to the vibration sensor 6. C indicates an area within two wavelengths of the elastic wave around the path 115 as a center.

First, when the edge surface of the vibration-proof material 7 is set to the position A, the overlap portion D of the area C and an vibration-proof material 7 occurs. In this overlap portion D, the vibration is fairly attenuated by the restriction by the vibration-proof material. If the vibration pen 3 is moved away from the vibration sensor 7 while keeping constant the distance from the boundary surface of the vibration-proof material, this tendency is enhanced. Thus, the influence by the portion D is further increased in the corner portions of the plate 8.

On the other hand, when the boundary surface of the vibration-proof material 7 is set to a position B, the area C does not overlap the vibration-proof material 7, so that the amplitude is not attenuated.

Figure 16:
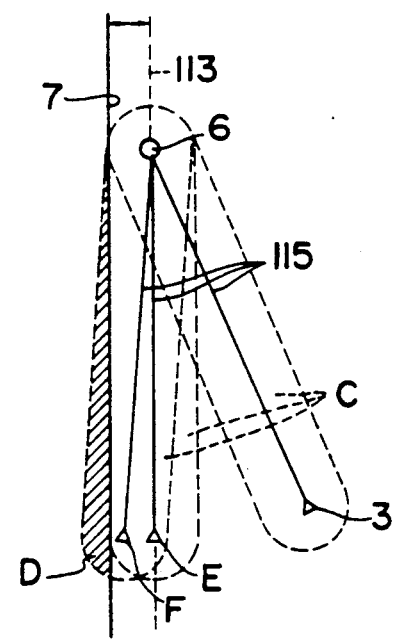
FIG. 16 is a plan view showing an effective arrangement range of the vibration sensor and an effective coordinates input range.

Therefore, as shown in FIG. 16, by setting the vibration sensor 6 to a position away from the vibration-proof material 7 rather than the position 113 (corresponding to the position B in FIGS. 14 and 15), the undetectable state of the coordinates caused by attenuation of the amplitude and the deterioration of the detecting accuracy of the coordinates is not caused, but the coordinates can be accurately detected.

However, if the vibration pen 3 is moved as indicated at F to a position near the vibration-proof material 7 rather than the position 113, the area C within two wavelengths from the vibration propagation path overlaps the vibration-proof material 7 as shown at D. Thus, the area where the high coordinates detecting accuracy is assured also exists in the inside region with respect to the position 113. That is, when the coordinates are input by the vibration pen 3 in the inside area than the position E, a good detecting characteristic is obtained.

Figure 17:
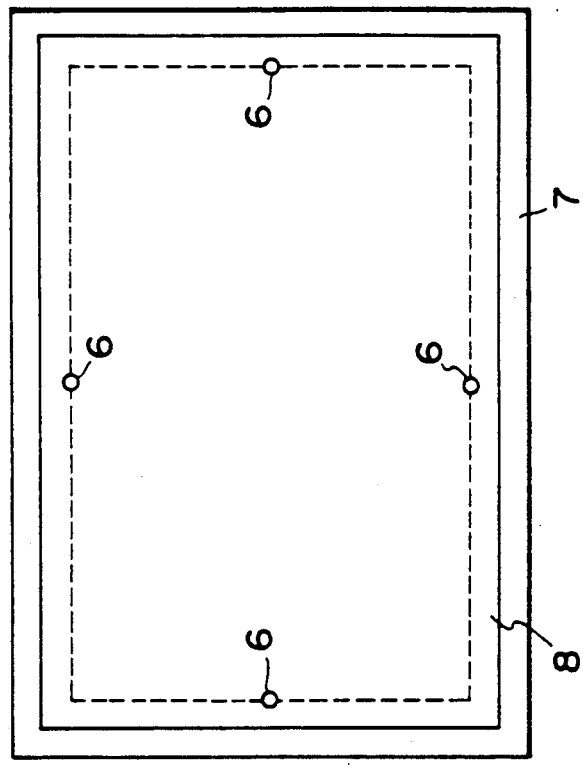
FIG. 17 is an explanatory diagram showing the positional relation among the vibration sensor, the vibration-proof material, and the vibration propagation plate in the present invention.

When the vibration sensor 6 is arranged as shown in FIG. 16, the positional relations among the vibration sensor 6, vibration-proof material 7, and vibration propagation plate 8 are as shown in FIG. 17. Although an example in which three vibration sensors 6 are provided has been shown in the foregoing structure, FIG. 17 shows four positions at each central portion of the four sides of the vibration propagation plate 8, at which the vibration sensors 6 can be attached. Each vibration sensor 6 is arranged at the position 113 (FIG. 16) away from the edge portion of the vibration-proof material 7 by two or more wavelengths or in the inside region relative to the position 113 with respect to each side of the plate 8. The minimum number of vibration sensors 6 is set to three and these sensors are arranged at positions other than on a straight line. Three or more sensors can be also attached.

Figure 18:
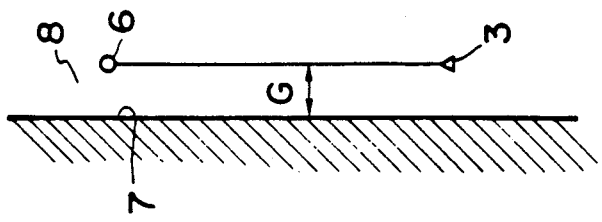
FIG. 18 is an explanatory diagram showing a state of experiment on which the invention is based.
Figure 19:
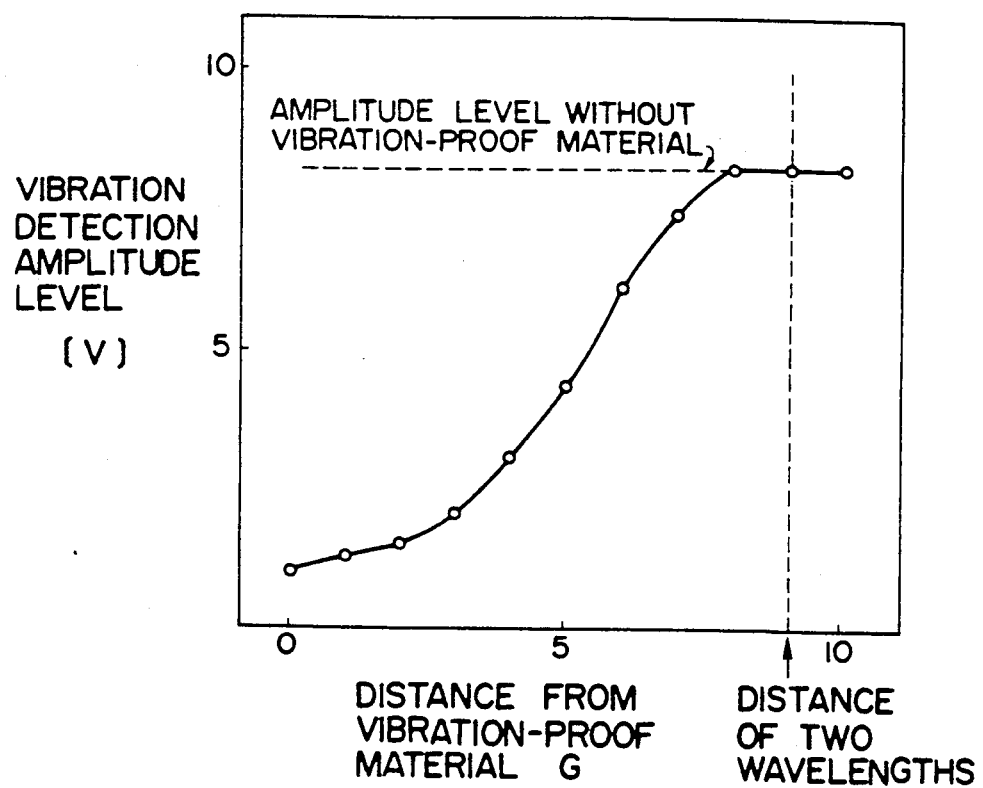
FIG. 19 is a diagram showing a detection amplitude level in the state of FIG. 18.

FIGS. 18 and 19 show the results of measurements which were used to determine the range to put the sensor 6 as being within two wavelengths from the vibration-proof material 7.

FIG. 18 shows the positional relations among the vibration pen 3, vibration sensor 6, and vibration-proof material 7 when the vibration propagation characteristic is measured. In these experiments, the line segment connecting the pen 3 and sensor 6 is set to be parallel with the edge side of the vibration-proof material 7. A distance G between this line segment and the edge side of the vibration-proof material 7 is changed. In this way, the detection amplitude level by the vibration sensor 6 is measured. In this case, the vibration-proof material 7 is made of a resin mainly consisting of vinyl chloride. The vibration propagation plate 8 is made of a glass plate having a thickness of 1 mm. The vibrating frequency is set to 400 kHz. The wavelength of the propagation elastic wave at this time is equal to about 4.5 mm.

The results are as shown in FIG. 19. As the distance G increases, the detection amplitude level by the vibration sensor 6 increases. When the distance G becomes the same as two wavelengths of the propagation elastic wave, the same detection amplitude level as that of the vibration-proof material 7 is derived.

As will be obvious from the above description, according to the present invention, in a coordinates input apparatus in which the vibration input by a vibration pen is detected by a plurality of vibration sensors attached to a vibration propagation plate, thereby detecting the coordinates of the vibration pen on the vibration propagation plate, this apparatus is constructed in a manner such that the vibration sensors are arranged at positions away from the vibration-proof material attached to the peripheral portion of the vibration propagation plate by a distance of two or more wavelengths of the vibration for detection of the coordinates. Thus, there is an excellent effect in that the vibration can be accurately detected without causing a problem such as an undetectable state of the coordinates by the attenuation of the vibration by the vibration-proof material 7 or the deterioration of the detecting accuracy.

What is claimed is:

1. A coordinates input apparatus comprising:
   a vibration pen to generate a vibration;
   a vibration propagation plate with which said vibration pen is brought into contact and which propagates the vibration;
   a sensor which is arranged in contact relation with said vibration propagation plate and detects the vibration;
   a vibration-proof material having an edge surface contacting said vibration propagation plate at a position spaced from a periphery of said vibration propagation plate by a distance which is substantially equal to an integer times $\frac{1}{2}$ of a wavelength of a phase signal waveform of said vibration and further comprising arithmetic operating means for calculating a contact position of said vibration pen on said vibration propagation plate on the basis of an arrival time of the phase signal waveform of said vibration detected by said sensor and an arrival time of a group signal waveform of said vibration.

2. An apparatus according to claim 1, wherein said sensor detects a plate wave transferred to said vibration propagation plate.

3. A coordinates input apparatus comprising:
   a vibration pen to generate a vibration;
   a vibration propagation plate with which said vibration pen is brought into contact and which propagates the vibration;
   vibration-proof material attached at the periphery of said vibration propagation plate;
   a sensor to detect the vibration which is propagated in said vibration propagation plate, said sensor being arranged in contact relation with said vibration propagation plate at a position spaced inside from the periphery of said vibration propagation plate by at least two wavelengths of a phase signal waveform of the vibration; and
   arithmetic operating means for calculating a contact position of said vibration pen on said vibration propagation plate on the basis of an arrival time of the phase signal waveform of said vibration detected by said sensor and an arrival time of a group signal waveform of the vibration.

4. An apparatus according to claim 3, wherein said sensor detects a plate wave transferred to said vibration propagation plate.

5. An apparatus according to claim 3, wherein said vibration-proof material has an edge surface contacting said vibration propagation plate at a position spaced from said periphery of said vibration propagation plate by a distance which is substantially equal to an integer times $\frac{1}{2}$ of a wavelength of the phase signal wave form of said vibration.

* * * * *

UNITED STATES PATENT AND TRADEMARK OFFICE
CERTIFICATE OF CORRECTION

PATENT NO.  : 5,097,415
DATED       : MARCH 17, 1992
INVENTOR(S) : YUICHIRO YOSHIMURA ET AL

Page 1 of 3

It is certified that error appears in the above-indentified patent and that said Letters Patent is hereby corrected as shown below: On the title page

[30] FOREIGN APPLICATION PRIORITY DATA

Insert, --[30] Foreign Application Priority Data
Mar. 24, 1987  [JP]  Japan...62-67855
Mar. 24, 1987  [JP]  Japan...62-67856--.

[57] ABSTRACT

Line 5, "comprises;" should read --comprises:--.

SHEET 3 OF 13

FIG. 2B, "SURFCE" should read --SURFACE--.

COLUMN 3

Line 49, "influenced" (second occurrence) should be deleted.
Line 50, "by the" should be deleted.
Line 57, "is" (second occurrence) should read --is hardly--.
Line 58, "hardly" should be deleted.
Line 64, "diagram" should read --diagrams--.

COLUMN 4

Line 55, "plate" should read --plates--.

COLUMN 5

Line 51, close up right margin.
Line 52, close up left margin.

UNITED STATES PATENT AND TRADEMARK OFFICE
CERTIFICATE OF CORRECTION

PATENT NO. : 5,097,415

DATED : March 17, 1992

INVENTOR(S) : YUICHIRO YOSHIMURA ET AL.   Page 2 of 3

It is certified that error appears in the above-identified patent and that said Letters Patent is hereby corrected as shown below:

COLUMN 7

Line 1, "waveform" should read --waveform,--.
    Line 15, "signed" should read --signal--.
    lINE 30, "value," should read --value.--.

COLUMN 8

Line 57, "n 1/2," should read --n $\lambda/2$,--.

COLUMN 9

Line 1, "sq" should read --so--.
    Line 21, "phases" should read --phases.--.

COLUMN 10

Line 56, "sensor 7" should read --sensor 6--.

UNITED STATES PATENT AND TRADEMARK OFFICE
CERTIFICATE OF CORRECTION

PATENT NO. : 5,097,415
DATED : March 17, 1992
INVENTOR(S) : YUICHIRO YOSHIMURA ET AL.     Page 3 of 3

It is certified that error appears in the above-identified patent and that said Letters Patent is hereby corrected as shown below:

COLUMN 12

Line 52, "said" should read --the--.

Signed and Sealed this

Thirteenth Day of July, 1993

Attest:

MICHAEL K. KIRK

Attesting Officer    Acting Commissioner of Patents and Trademarks